United States Patent
Lin

(10) Patent No.: US 10,996,789 B1
(45) Date of Patent: May 4, 2021

(54) TOUCH DISPLAY PANEL AND METHOD OF AUTOMATICALLY RECORDING FIRMWARE THEREOF

(71) Applicant: Quanta Computer Inc., Taoyuan (TW)

(72) Inventor: Hsin-Liang Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/861,421

(22) Filed: Apr. 29, 2020

(30) Foreign Application Priority Data

Nov. 7, 2019 (TW) .................................. 108140347

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .............................. G06F 3/0416; G06F 3/044
See application file for complete search history.

(56) References Cited

U.S. PATENT DOCUMENTS

| 2008/0179112 A1* | 7/2008 | Qin | ..................... G06F 3/03547 178/18.06 |
| 2011/0193817 A1* | 8/2011 | Byun | ..................... G06F 3/045 345/174 |
| 2017/0076660 A1* | 3/2017 | Lee | ..................... G09G 3/3208 |
| 2017/0111205 A1* | 4/2017 | Kasher | ..................... H04L 1/00 |
| 2017/0241799 A1* | 8/2017 | Yanni | ..................... G01C 25/005 |
| 2018/0046325 A1* | 2/2018 | Kim | ..................... G06F 3/0418 |
| 2018/0275789 A1* | 9/2018 | Chai | ..................... G06F 3/0446 |
| 2018/0341030 A1* | 11/2018 | Kikuchi | ..................... G01T 1/208 |

OTHER PUBLICATIONS

Chinese language office action dated Sep. 1, 2020, issued in application No. TW 108140347.

* cited by examiner

*Primary Examiner* — Ryan A Lubit
(74) *Attorney, Agent, or Firm* — McClure, Qualey & Rodack, LLP

(57) ABSTRACT

A touch display panel is provided. The touch display panel includes: a display panel, a touch glass, and a touch controller. The display panel includes sensing lines and identification pins. The touch controller obtains first product information of the touch glass. The touch controller and the display panel respectively report the first product information of the touch glass and second product information of the display panel to a host. The host retrieves firmware and a default noise offset value corresponding to the touch display panel according to the first product information and the second product information, and writes the firmware and default noise offset value to a non-volatile memory of the touch display panel. The touch controller executes the firmware, and determines touch actions performed on the touch glass according to the default noise offset value.

10 Claims, 4 Drawing Sheets

TOUCH DISPLAY PANEL AND METHOD OF AUTOMATICALLY RECORDING FIRMWARE THEREOF

CROSS REFERENCE TO RELATED APPLICATIONS

This Application claims priority of Taiwan Patent Application No. 108140347, filed on Nov. 7, 2019, the entirety of which is incorporated by reference herein.

BACKGROUND OF THE INVENTION

Field of the Invention

The present invention relates to touch display panels, and, in particular, to a touch display panel and a method of automatically burning firmware thereof.

Description of the Related Art

In the manufacturing and assembly process of touch display panels, touch glass, touch controllers, and display panels are all produced by different manufacturers, and the same type of touch glass, touch controller, or display panels (such as LCD panels or LED panels) may also have a large number of product numbers, so the number of combinations produced by the above-mentioned three products is quite large. Because of different product characteristics, each combination of touch glass, touch controller, and display panel has a corresponding noise offset value, and the number of sensing lines, and thus each combination requires corresponding firmware for the touch controller to correctly determine the touch action.

However, in the manufacturing and assembly process at the factory end, it is easy to cause a firmware version that cannot correspond to a combination of a touch glass, a touch controller, and a display panel due to human problems. For example, before the touch glass and the display panel are pasted or pressed together in the conventional manufacturing assembly process, it is required to download the firmware corresponding to the combination the touch glass, the touch controller, and the display panel to the storage unit associated with the touch controller in advance. Once the touch glass is pressed together with the display panel, if the firmware of the touch controller is to be modified, rework is needed to separate the touch glass from the display panel or replace either one. The aforementioned rework action may even cause damage to the touch glass or display panel, thereby causing an increase in manufacturing cost.

Accordingly, there is demand for a touch display panel and a method of automatically burning firmware thereof to solve the aforementioned problem.

BRIEF SUMMARY OF THE INVENTION

A detailed description is given in the following embodiments with reference to the accompanying drawings.

In an exemplary embodiment, a touch display panel is provided. The touch display panel includes a display panel; a touch glass, and a touch controller. The touch glass includes a plurality of sensing lines and a plurality of identification pins, wherein the touch glass is pressed onto the display panel. The touch controller is electrically connected to the touch glass, and configured to obtain first product information of the touch glass. The touch controller and the display panel respectively report the first product information of the touch glass and second product information of the display panel to a host. The host retrieves firmware and a default noise offset value corresponding to the touch display panel according to the first product information and the second product information, and writes the firmware and default noise offset value to a non-volatile memory of the touch display panel. The touch controller reads and executes the firmware stored in the non-volatile memory, and determines touch actions performed on the touch glass according to the default noise offset value.

In some embodiments, the host converts a first bus protocol to a second bus protocol that is used by the touch controller via a bridge device, detects manufacturer information of the touch controller using a first device address in the second bus protocol, and issues a read command to the touch controller to read the first product information of the touch glass according to second device addresses defined in the manufacturer information, wherein the first bus protocol is different from the second bus protocol.

In some embodiments, the first product information of the touch glass comprises a product number, a manufacturer, a number of X-axis/Y-axis sensing lines, resolution, and starting coordinates of the touch glass.

In some embodiments, the second product information of the display panel comprises resolution, a manufacturer name, a product name, a product number, and timing information of the display panel.

In some embodiments, after the host has written the firmware and the default noise offset value to the non-volatile memory of the touch display panel, the touch controller executes the firmware to test an open-circuited status and a short-circuited status of each sensing line of the touch glass, adjusts the default noise offset value according to a test result to generate a first noise offset value, and determines the touch actions performed on the touch glass according to the first noise offset value.

In another exemplary embodiment, a method of automatically burning firmware for use in a touch display panel. The touch display panel comprises a display panel, a touch glass, and a touch controller, and the touch glass is pressed onto the display panel, the method comprising: utilizing the touch controller and the display panel to respectively report first product information of the touch glass and second product information of the display panel to a host; utilizing the host to retrieve firmware and a default noise offset value corresponding to the touch display panel according to the first product information and the second product information, and writing the firmware and default noise offset value to a non-volatile memory of the touch display panel; and utilizing the touch controller to read and execute the firmware stored in the non-volatile memory, and to determine touch actions performed on the touch glass according to the default noise offset value.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
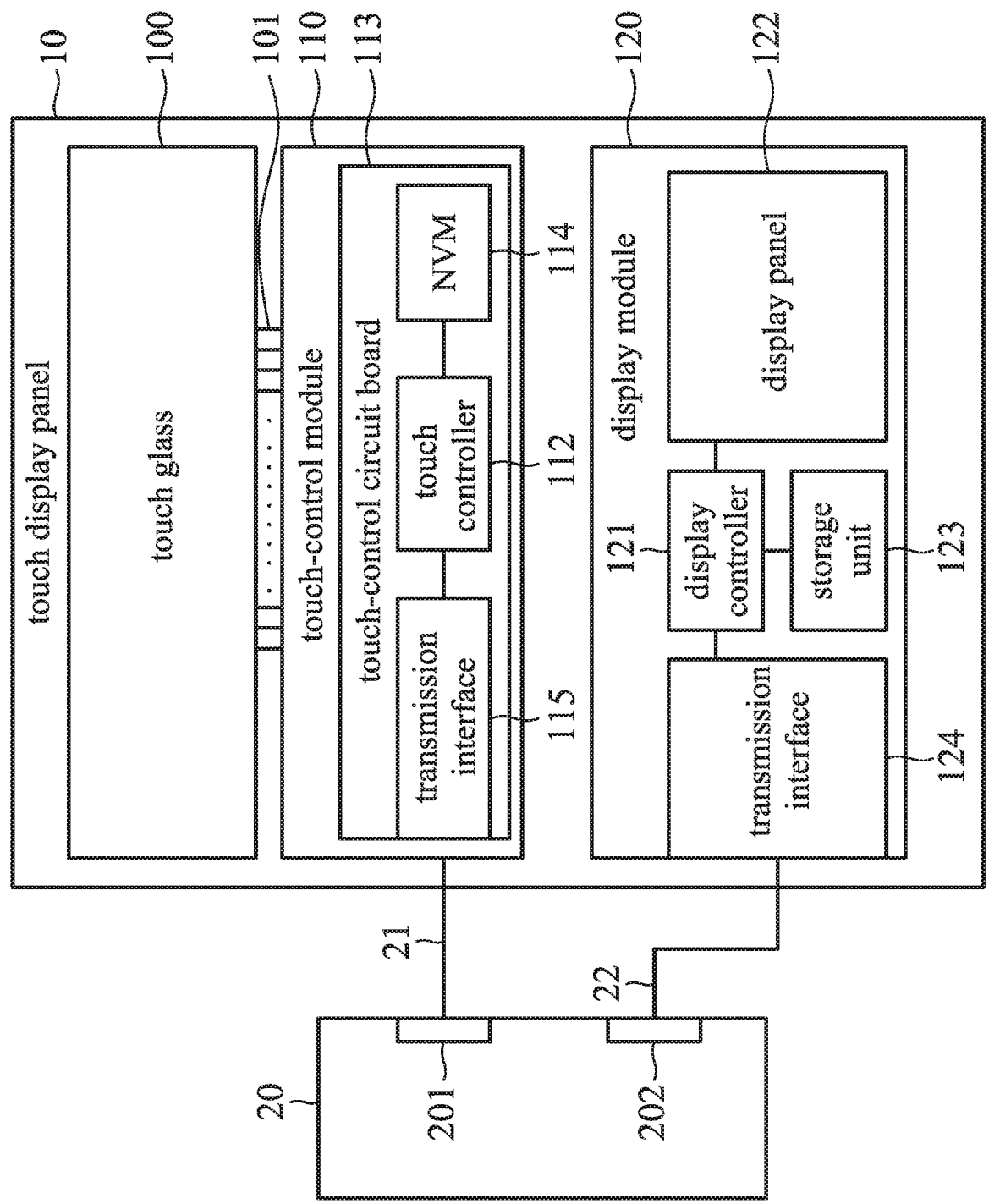
FIG. 1A is a diagram of a touch display panel in accordance with an embodiment of the invention.
Figure 1B:
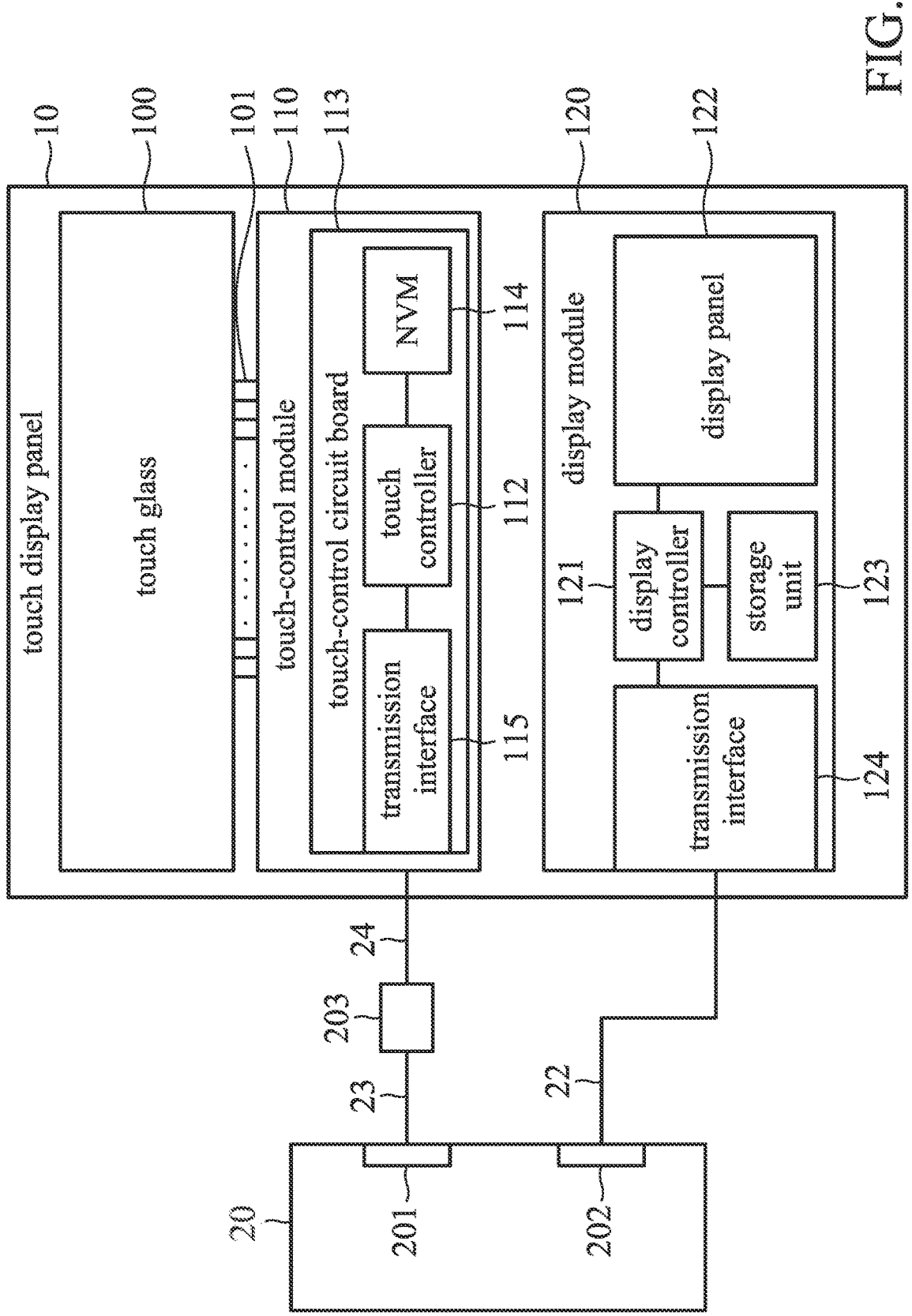
FIG. 1B is a diagram of the touch display panel in accordance with another embodiment of the invention.

FIG. 1A is a diagram of a touch display panel in accordance with an embodiment of the invention. FIG. 1B is a diagram of the touch display panel in accordance with another embodiment of the invention.

The touch display panel 10, for example, may be disposed in an electronic device such as a portable electronic device, a display, a television, or a laptop. As depicted in FIG. 1, the touch display panel 10 may include a touch glass 100, a touch-control module 110, and a display module 120, but the invention is not limited thereto. The touch glass 100 is pasted or pressed onto the display panel 122 of the display module 120. The touch-control module 110 may include a touch controller 112 (e.g., a touch-control chip). The touch glass 100 is also referred to as a capacitive touch panel. The touch glass 100 is electrically connected to the touch controller 112, and the touch controller 112 is disposed on a touch-control circuit board 113.

For example, the touch glass 100 has a plurality of sensing lines on the X-Y plane, such as a plurality of X-axis sensing lines (e.g., M sensing lines) and a plurality of Y-axis sensing lines (e.g., N sensing lines). The touch controller 112 may receive the variations of the capacitance values on different sensing lines or sensing channels that are used to determine the touch operation on the touch display panel 10. In addition, the touch glass 100 may include one or more identification pins 101 that are electrically connected to the touch controller 112 via a bus (e.g., an I2C bus or SPI bus), so that the touch controller 112 may read the product information (e.g., first product information) corresponding to the touch glass 100 through the identification pins 101, such as the product number, manufacturer, number of X-axis and Y-axis sensing lines, resolution, starting coordinates of the touch glass 100, etc. For example, the starting coordinates may be regarded as the origin from the upper-left, upper-right, bottom-left, or bottom-right corner of the touch glass 100, and the X and Y coordinates of the origin may be a combination of plus or minus 1 or 0, depending on the design of the manufacturer.

In the embodiment, a non-volatile memory 114 and a transmission interface 115 are disposed on the touch-control circuit board 113. The non-volatile memory 114, for example, can be implemented by an electrically erasable programmable read-only memory (EEPROM) or a static random access memory (SRAM), but the invention is not limited thereto. The transmission interface may be a data transmission interface such as an interface of an I2C bus interface, an SPI bus interface, or a USB bus interface, but the invention is not limited thereto. The non-volatile memory 114 is configured to store firmware associated with the touch controller 112, and the touch controller 12 may read the associated firmware from the non-volatile memory for execution to correctly determining touch actions.

The display module 120 may include a display controller 121, a display panel 122, a storage unit 123, and a transmission interface 124. The transmission interface 124 may be a data transmission interface such as an interface of an I2C bus, an SPI bus, or a USB bus, but the invention is not limited thereto. The display controller 121 may receive control commands from the host 20 or respond the display-panel information to the host 20 through the transmission interface 124, wherein the aforementioned display-panel information may be "extended display identification data (EDID)" information that may include the resolution, manufacturer, product name, product number, timing information of the display panel 122. The storage unit 123, for example, may be a read-only memory or a non-volatile memory that is configured to store program code or firmware for controlling the display panel 122. The display controller 121 may read the program code or firmware from the storage unit 123 for execution, thereby controlling the display operations of the display panel 122.

In an embodiment, the host 20, for example, may be a personal computer or a server. The transmission interfaces 201 and 202 of the host 20 may respectively correspond to the transmission interfaces 115 and 124 that may be I2C interfaces. The transmission interfaces 201 and 202 may be electrically connected to the transmission interfaces 115 and 124 through the I2C cables 21 and 22, respectively, as shown in FIG. 1A. In another embodiment, the transmission interface 201 of the host 20 may be a USB interface, and can be connected to the bridge 203 through the USB cable 23. The bridge 203 can convert the USB protocol to the I2C protocol and pass the I2C cable 24 to connect to the transmission interface 115.

For example, the host 20 may retrieve the manufacturer information of the touch controller 112 using the corresponding device address of the touch controller 112 through the transmission interface 201 and 115. Because the touch controllers 112 produced by different manufacturers may have different device addresses and operations, the host 20 may issue appropriate read commands to the touch controller 112 using the retrieved manufacturer information of the touch controller 112, thereby obtaining the product information of the touch glass 100.

When the host 20 has confirmed the manufacturer information corresponding to the touch controller 112, the host 20 may issue read commands corresponding to the touch controller 112 to obtain the identification information corresponding to the touch glass 100. In addition, the host 20 may obtain corresponding information of the display panel 122 from the display controller 121 through the transmission interfaces 202 and 124, such as the resolution, manufacturer, product name, product number, and timing information of the display panel 122.

However, different combinations of the touch glass 100 and display panel 122 may have different noise offset values, and it indicates that the touch controller 112 may be affected by the noise offset value while determining the variations of capacitance values on different sensing lines of the touch glass 100. Specifically, there are many electrodes on the X-axis sensing lines and Y-axis sensing lines of the touch glass 100, and the touch controller 112 has to determine whether each intersection region between the X-axis sensing lines and Y-axis sensing lines is short-circuited or open-circuited.

In addition, because capacitive sensing technology may be used in the touch glass 100, noise cancellation is required to adjust the noise level for determining touch actions. One having ordinary skill in the art will appreciate the noise cancellation technique for determining touch actions, and thus the details will be omitted here.

Additionally, the tolerance values of the touch glasses produced by different manufacturers may also differ, and the noise offset value of the touch glass 100 that is pasted to the display panel 122 may also change. Thus, different combinations of the touch glasses 100 and display panels 122 are required for experiments to obtain a better noise offset value for each combination to facilitate the touch controller 112 to perform calibration, thereby correctly determining the touch actions performed on the touch glass 100.

Table 1 shows the firmware lookup table that is used by the touch controller 112.

TABLE 1

| Display Panel ID | EDID Prod. Name | Resolution | Glass ID | Manufacture | Size | Noise Offset | FW ID |
|---|---|---|---|---|---|---|---|
| 1 | AUO XXXX1 | HD | 1 | a | 12' | 0x0000 | 1 |
| 2 | AUO XXXX2 | FHD | 2 | a | 12' | 0x0001 | 2 |
| 3 | LG XXXX1 | HD | 3 | b | 14' | 0x0003 | 3 |
| 4 | LG XXXX2 | FHD | 4 | b | 14' | 0x0000 | 4 |
| 5 | LG XXXX3 | HD | 5 | c | 12' | 0x0002 | 5 |
| 6 | LG XXXX4 | FHD | 6 | c | 12' | 0x0004 | 6 |
| 7 | BOE XXXX1 | HD | 7 | c | 14' | 0x0001 | 7 |
| 8 | BOE XXXX2 | FHD | 8 | c | 14' | 0x0005 | 8 |
| 9 | INX XXXX1 | HD | 9 | c | 12' | 0x0002 | 9 |
| 10 | INX XXXX2 | FHD | 10 | c | 12' | 0x0000 | 10 |

For example, Table 1 shows the display-panel ID and its EDID information (e.g., product name) and resolution (e.g., HD, FHD, or other resolution), and the glass ID, manufacturer (e.g., manufacturer a~c), and size of the touch glass 100 (e.g., 12', 14' or other sizes). Accordingly, different combinations of the display panels 122 and touch glasses 100 may be different noise offset values, and the touch controller 112 requires the firmware (e.g. FW ID 1 to 10) corresponding to different combinations of the display panels 122 and touch glasses 100 to correctly determining the touch actions. It should be noted that Table 1 is used to describe some combinations of the display panels 122 and touch glasses 100 and their corresponding information, but the invention is not limited to the information shown in Table 1.

After the host 20 has obtained the information corresponding to the touch controller 112, touch glass 100, and display panel 122 using the techniques described in the aforementioned embodiments, the host 20 may obtain the SKU ID of the currently used combination of the touch glass 100 and display panel 122, and upload or burn the firmware corresponding to the firmware ID to the non-volatile memory 114 of the touch-control module 110. Accordingly, the touch controller 112 may read the firmware, that is stored in the non-volatile memory 114, corresponding to the currently used combination of the touch glass the display panel 122 to determine touch actions. After the touch controller 12 has executed the firmware, the touch controller 112 may perform tests on the X-axis/Y-axis sensing lines of the touch glass 100, such as testing the short-circuited status or open-circuited status of each sensing lines, and fine-tunes the default noise values of the touch glass 100 to achieve the best touch-control effect.

Figure 2A:
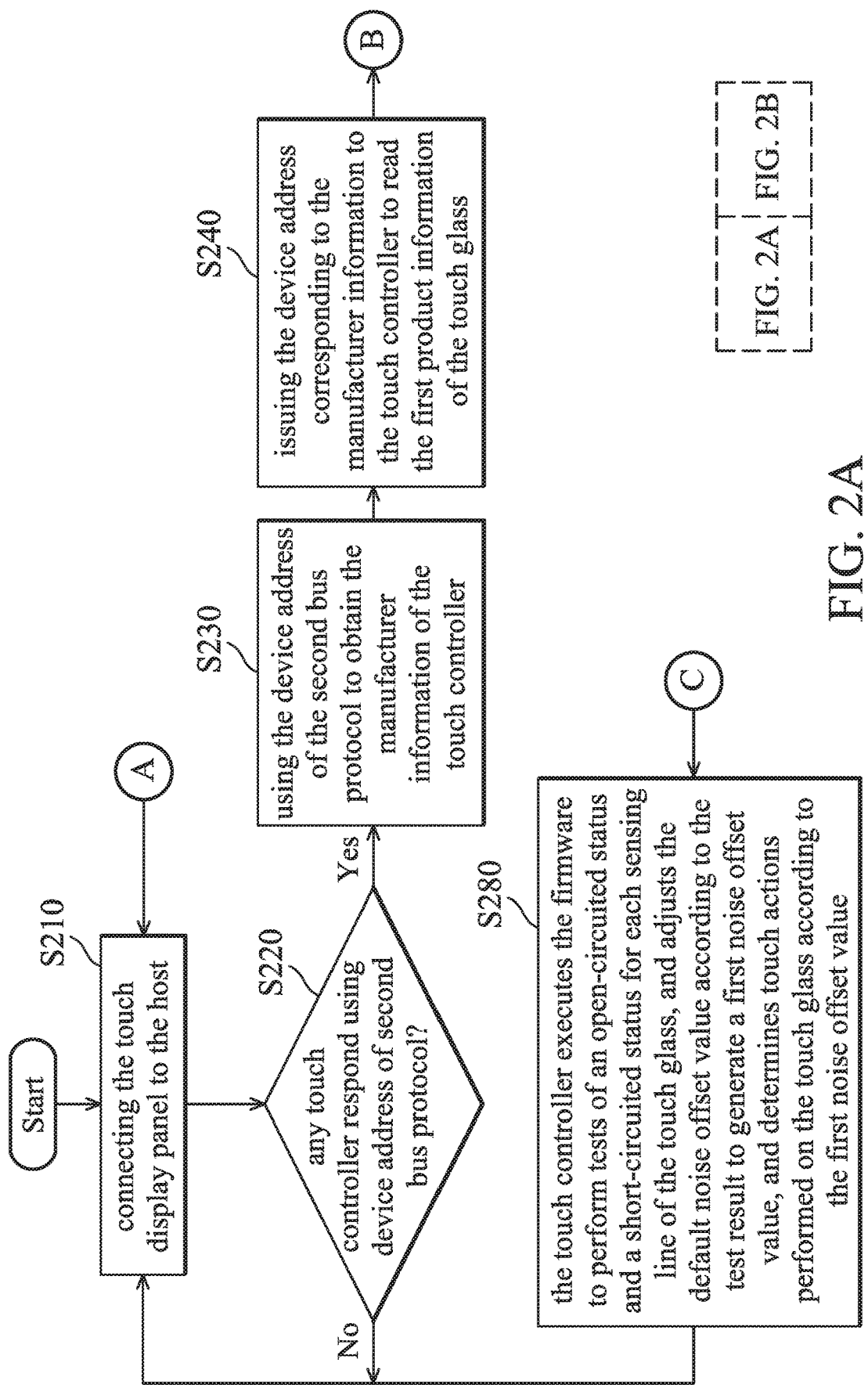
FIGS. 2A and 2B are portions of a flow chart of a method of automatically burning firmware into a touch controller in accordance with an embodiment of the invention.
Figure 2B:
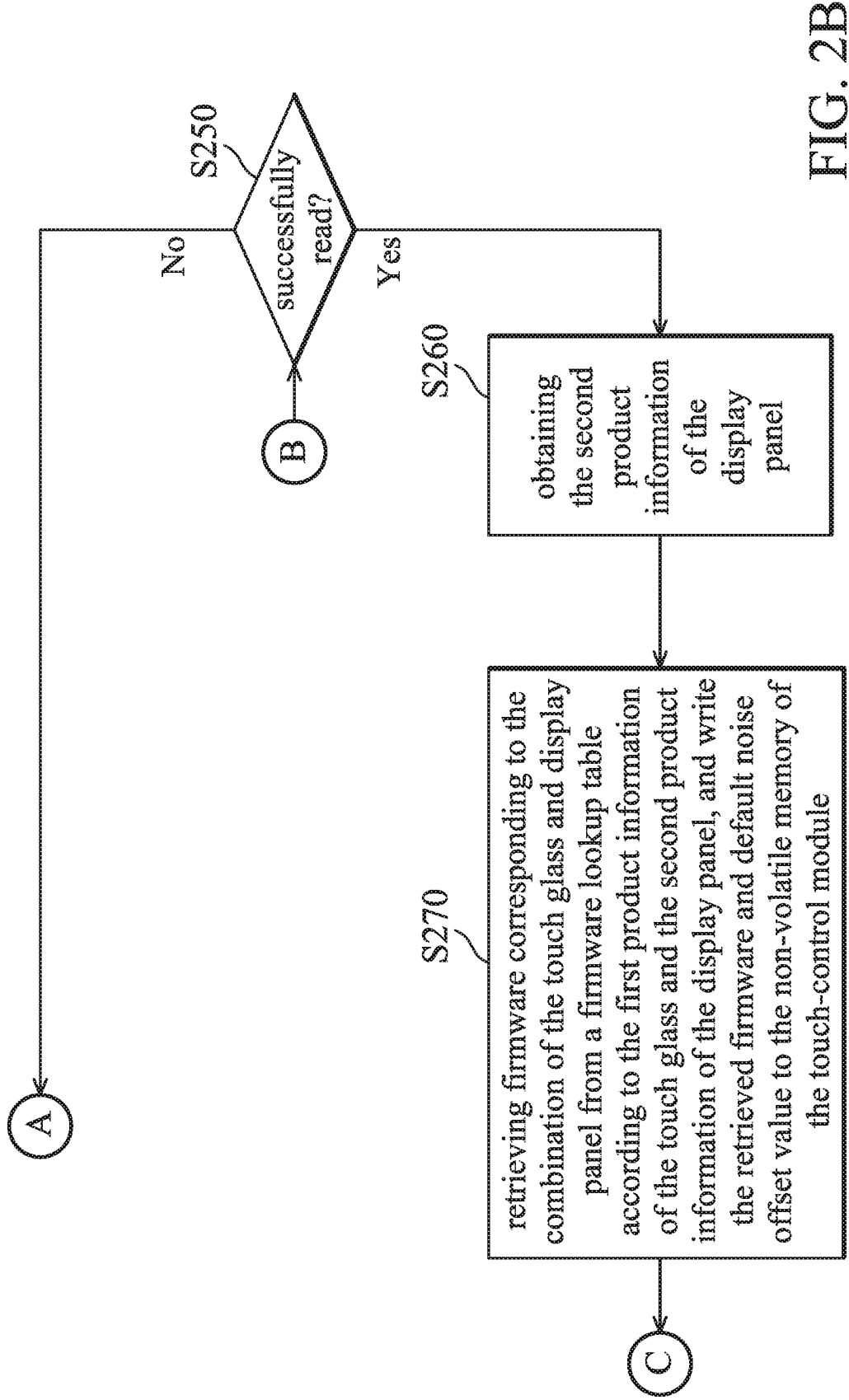

FIGS. 2A and 2B are portions of a flow chart of a method of automatically burning firmware into a touch controller in accordance with an embodiment of the invention.

In step S210, the touch display panel 10 is connected to the host 20. For example, the transmission interfaces 201 and 202 of the host 20 may be electrically connected to the interfaces 115 and 124 using I2C cables 21 and 22, respectively, as shown in FIG. 1A. In another embodiment, the transmission interface 201 of the host 20 may be a USB interface, and can be connected to the bridge 203 through the USB cable 23. The bridge 203 can convert the USB protocol (e.g., a first bus protocol) to the I2C protocol (e.g., a second bus protocol) and pass the I2C cable 24 to connect to the transmission interface 115. Accordingly, the host 20 may retrieve the manufacturer information of the touch controller 112 using the particular device addresses of the second bus protocol, and issue read commands to the touch controller 112 to read first product information of the touch glass 100 according to the device addresses defined in the manufacturer information.

In step S220, the host 20 detects whether any touch controller 112 responds to a device address of the second bus protocol. For example, the host 20 may use the device address defined in the I2C protocol to obtain the manufacturer information of the touch controller 112. If there is response from the touch controller 112, step S230 is performed. If there is no response from any touch controller 112, step S210 is performed to check whether the touch display panel 10 and the host 20 are correctly connected.

In step S230, the host 20 uses the device address of the second bus protocol to obtain the manufacturer information of the touch controller 112. For example, the host 20 may obtain the manufacturer information of the touch controller 112 using the device address defined in the I2C protocol.

Because the touch controllers 112 produced by different manufacturers may have different device addresses and operations, the host 20 may issue appropriate read commands to the touch controller 112 using the retrieved manufacturer information of the touch controller 112, thereby obtaining the product information of the touch glass 100 such as product number, manufacturer, number of X-axis/Y-axis sensing lines, resolution, and starting coordinates of the touch glass 100.

In step S240, the host 20 issues the device address corresponding to the manufacturer information to the touch controller 112 to read the first product information of the touch glass 100. For example, the aforementioned first product information of the touch glass 100 may include the product number, manufacturer, number of X-axis/Y-axis sensing lines, resolution, and starting coordinates of the touch glass 100.

In step S250, the host 20 determines whether the first product information of the touch glass 100 can be successfully read. If the first product information of the touch glass 100 can be successfully read, step S250 is performed. If the first product information of the touch glass cannot be successfully read, step S210 is performed to check whether the touch display panel 10 and the host 20 are correctly connected.

In step S260, the host 20 obtains the second product information of the display panel 122. For example, the host 20 may obtain corresponding information of the display panel 122 from the display controller 121 through the transmission interfaces 202 and 124, such as the resolution, manufacturer, product name, product number, and timing information of the display panel 122.

In step S270, the host 20 retrieves firmware corresponding to the combination of the touch glass 100 and display panel 122 from a firmware lookup table according to the first product information of the touch glass 100 and the second product information of the display panel 122, and write the retrieved firmware and default noise offset value to the non-volatile memory 114 of the touch-control module 110.

For example, the host 20 may build a firmware lookup table as shown in Table 1 in advance, and find the firmware number and default noise offset value corresponding to the combination of the retrieved first product information and second product information, and write the firmware and default noise offset value to the non-volatile memory 114 of the touch-control module 110, so that the touch controller 112 may execute the firmware to determine the touch actions performed on the touch glass 100.

In step S280, the touch controller 112 executes the firmware to perform tests of an open-circuited status and a short-circuited status for each sensing line of the touch glass 100, and adjusts the default noise offset value according to the test result to generate a first noise offset value, and determines touch actions performed on the touch glass 100 according to the first noise offset value. For example, after the touch controller 112 has executed the firmware, the touch controller 112 may perform tests on the X-axis/Y-axis sensing lines of the touch glass 100, such as the open-circuited status and short-circuited status of each sensing line, and fine-tunes the default noise offset value of the touch glass 100 to achieve the best touch-control effect.

In view of the above, a touch display panel and a method of automatically burning firmware thereof are provided in the present invention. The touch display panel and the method are capable of utilizing the host to automatically detect different combinations of the touch controller, touch glass, and display panel, selecting the firmware corresponding to the touch display panel, and writing the firmware to the touch-control module. Accordingly, the touch display panel and the method of automatically burning firmware thereof are capable of avoid the fact the firmware version can easily be cause by human problems during the manufacturing and assembly process at the factory side, which cannot correspond to the combination of the touch glass, touch controller, and display panel.

In addition, since the touch display panel has been attached to the display panel after being shipped from the factory, the touch display panel and the method of automatically burning firmware of the present invention can eliminate the need to separate the touch glass from the display panel or to change the touch glass or the display panel, and the firmware required by the touch controller can be modified or updated by re-burning the firmware into the touch-control module, thereby reducing maintenance and manufacturing costs.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display panel, comprising:
a display panel;
a touch glass, comprising a plurality of sensing lines and a plurality of identification pins, wherein the touch glass is pressed onto the display panel;
a touch controller, electrically connected to the touch glass, and configured to obtain first product information of the touch glass,
wherein the touch controller and the display panel respectively report the first product information of the touch glass and second product information of the display panel to a host,
wherein the host retrieves firmware and a default noise offset value corresponding to the touch display panel according to the first product information and the second product information, and writes the firmware and default noise offset value to a non-volatile memory of the touch display panel,
wherein the touch controller reads and executes the firmware stored in the non-volatile memory, and determines touch actions performed on the touch glass according to the default noise offset value.

2. The touch display panel as claimed in claim 1, wherein the host converts a first bus protocol to a second bus protocol that is used by the touch controller via a bridge device, detects manufacturer information of the touch controller using a first device address in the second bus protocol, and issues a read command to the touch controller to read the first product information of the touch glass according to second device addresses defined in the manufacturer information, wherein the first bus protocol is different from the second bus protocol.

3. The touch display panel as claimed in claim 1, wherein the first product information of the touch glass comprises a product number, a manufacturer, a number of X-axis/Y-axis sensing lines, resolution, and starting coordinates of the touch glass.

4. The touch display panel as claimed in claim 1, wherein the second product information of the display panel comprises resolution, a manufacturer name, a product name, a product number, and timing information of the display panel.

5. The touch display panel as claimed in claim 1, wherein after the host has written the firmware and the default noise offset value to the non-volatile memory of the touch display panel, the touch controller executes the firmware to test an open-circuited status and a short-circuited status of each sensing line of the touch glass, adjusts the default noise offset value according to a test result to generate a first noise offset value, and determines the touch actions performed on the touch glass according to the first noise offset value.

6. A method of automatically burning firmware for use in a touch display panel, wherein the touch display panel comprises a display panel, a touch glass, and a touch controller, and the touch glass is pressed onto the display panel, the method comprising:
  utilizing the touch controller and the display panel to respectively report first product information of the touch glass and second product information of the display panel to a host;
  utilizing the host to retrieve firmware and a default noise offset value corresponding to the touch display panel according to the first product information and the second product information, and writing the firmware and default noise offset value to a non-volatile memory of the touch display panel; and
  utilizing the touch controller to read and execute the firmware stored in the non-volatile memory, and to determine touch actions performed on the touch glass according to the default noise offset value.

7. The method as claimed in claim 6, wherein the host converts a first bus protocol to a second bus protocol that is used by the touch controller via a bridge device, and the method further comprises:
  detecting manufacturer information of the touch controller using a first device address in the second bus protocol; and
  issuing a read command to the touch controller to read the first product information of the touch glass according to second device addresses defined in the manufacturer information, wherein the first bus protocol is different from the second bus protocol.

8. The method as claimed in claim 6, wherein the first product information of the touch glass comprises a product number, a manufacturer, a number of X-axis/Y-axis sensing lines, resolution, and starting coordinates of the touch glass.

9. The method as claimed in claim 6, wherein the second product information of the display panel comprises resolution, a manufacturer name, a product name, a product number, and timing information of the display panel.

10. The method as claimed in claim 6, wherein after the host has written the firmware and the default noise offset value to the non-volatile memory of the touch display panel, the method further comprises:
  utilizing the touch controller to execute the firmware to test an open-circuited status and a short-circuited status of each sensing line of the touch glass, adjust the default noise offset value according to a test result to generate a first noise offset value, and determine the touch actions performed on the touch glass according to the first noise offset value.

\* \* \* \* \*